United States Patent
Takushima et al.

(10) Patent No.: US 6,825,981 B2
(45) Date of Patent: Nov. 30, 2004

(54) OPTICAL SIGNAL PROCESSOR

(75) Inventors: Michiko Takushima, Yokohama (JP);
Tomomi Sano, Yokohama (JP);
Makoto Katayama, Yokohama (JP);
Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/682,075

(22) Filed: Oct. 10, 2003

(65) Prior Publication Data

US 2004/0076368 A1 Apr. 22, 2004

Related U.S. Application Data

(60) Provisional application No. 60/462,713, filed on Apr. 15, 2003.

(30) Foreign Application Priority Data

Oct. 10, 2002 (JP) ..................................... P2002-297625

(51) Int. Cl.$^7$ ............................ G02B 27/44; G02B 5/18
(52) U.S. Cl. ........................... 359/566; 385/24; 385/37; 398/87
(58) Field of Search ............................ 359/566; 385/10, 385/18, 24, 31, 37, 39; 398/83, 84, 87

(56) References Cited

U.S. PATENT DOCUMENTS

| | | | |
|---|---|---|---|
| 5,936,752 A | * | 8/1999 | Bishop et al. ............... 398/90 |
| 5,960,133 A | | 9/1999 | Tomlinson |
| 6,687,431 B2 | * | 2/2004 | Chen et al. .................. 385/24 |

* cited by examiner

*Primary Examiner*—Leo Boutsikaris
(74) *Attorney, Agent, or Firm*—McDermott Will & Emery LLP

(57) ABSTRACT

The present invention relates to an optical signal processor which can multiplex or demultiplex multiwavelength signal light. The optical signal processor includes an optical input/output capability, a first optical system, a wavelength branching capability, a second optical system, and a reflecting capability.

14 Claims, 6 Drawing Sheets

OPTICAL SIGNAL PROCESSOR

CROSS-REFERENCE TO RELATED APPLICATION

This application claims priority to Provisional Application Ser. No. 60/462,713 filed on Apr. 15, 2003 which is hereby incorporated by reference in its entirety.

BACKGROUND OF THE INVENTION

1. Field of the Invention

The present invention relates to an optical signal processor which can multiplex or demultiplex multiwavelength signal light.

2. Related Background Art

Diffraction grating devices act as so-called wavelength branching means. When multiplexed multiwavelength signal light is inputted, a diffraction grating device can cause the multiwavelength signal light to branch off spatially into the individual wavelengths. An optical signal processor using such wavelength branching means can receive multiplexed multiwavelength signal light, demultiplex it into individual wavelengths or bands, and output them; or multiplex multiwavelength signal light components inputted for the individual wavelengths or bands and output thus multiplexed signal light. The optical signal processor is used as an optical multiplexer, an optical demultiplexer, an optical ADM (Add Drop Multiplexer), and the like in optical communication systems.

Such an optical signal processor is disclosed, for example, in Document 1: U.S. Pat. No. 5,960,133. The optical signal processor disclosed in Document 1 comprises a reflection type diffraction grating device as wavelength branching means, a lens, and mirrors. The diffraction grating device causes the light fed into an input port to branch off spatially into individual wavelengths. The lens converges the individual wavelength components of signal light separated by the diffraction grating device in terms of wavelength. The mirrors are disposed at respective points on which the individual wavelength components of signal light are converged by the lens. The individual wavelength components of signal light reflected by the mirrors pass the lens and diffraction grating device in the direction opposite from the outgoing path, so as to be outputted from output ports. The mirrors are provided for the individual wavelengths, whereas the angles of inclination of their reflecting surfaces are controllable. By adjusting the inclination angle of the reflecting surface of each mirror, the optical signal processor acts as an optical ADM while being able to change the wavelength of signal light to be added or dropped.

SUMMARY OF THE INVENTION

The optical signal processor configured as mentioned above has a structure in which wavelength components of signal light after wavelength separation are converged onto reflecting surfaces of mirrors by a lens. Therefore, in order to improve the wavelength resolution, the degree of convergence is required to be high at the time when the signal light is converged by the lens. In general, for attaining a high degree of convergence, it will be sufficient if the beam diameter of light is made greater when the light is incident on the lens. However, in the optical signal processor configured as mentioned above, it is necessary for the individual wavelength components of signal light to be arranged parallel to each other between the input/output port and the diffraction grating device, so as to be kept from spatially overlapping each other. Therefore, the optical signal processor must enhance its size if its wavelength resolution is to be improved, whereby there is a tradeoff between the improvement in wavelength resolution and the smaller size.

In order to overcome the problem mentioned above, it is an object of the present invention to provide an optical signal processor which can improve its wavelength resolution and reduce its size.

The optical signal processor in accordance with the present invention comprises optical input/output means, a first optical system, wavelength branching means, a second optical system, and reflecting means. The optical input/output means includes a plurality of input/output ports for inputting or outputting light. The plurality of input/output ports have respective light input/output directions, in parallel with each other, located on a first virtual plane. The optical input/output means inputs light into any of the plurality of input/output ports and outputs the light from any of the other input/output ports. The first optical system collimates the light arriving from any of the plurality of input/output ports, and outputs thus collimated light. The wavelength branching means receives the light collimated by the first optical system, spatially separates the light in terms of wavelength, and outputs thus obtained wavelength light components. Thus outputted wavelength light components have respective optical axes located on a second virtual plane. The second optical system receives the wavelength light components outputted from the wavelength branching means after wavelength separation, and converges the wavelength light components. The reflecting means includes a mirror with a reflecting surface positioned at a light-converging point of the wavelength light components converged by the second optical system. The reflecting means causes the light reflected by the mirror to be outputted from any of the plurality of input/output ports by way of the second optical system, wavelength branching means, and first optical system. The first and second virtual planes are not parallel to each other. The light fed into the wavelength branching means after being collimated by the first optical system has a greater beam width in a direction parallel to the second virtual plane than in a direction perpendicular to the second virtual plane.

The optical signal processor is operable as an optical demultiplexer, an optical multiplexer, or an optical ADM. Namely, when multiplexed signal light is fed into any of the plurality of input/output ports included in the optical input/output means, the multiplexed signal light is collimated by the first optical system so as to be fed into the wavelength branching means, and is spatially separated in terms of wavelength by the wavelength branching means so as to be outputted into respective directions corresponding to the individual wavelengths. The wavelength components of signal light separated in terms of wavelength are converged by the second optical system so as to be made incident on and reflected by any mirror included in the reflecting means. Thus reflected wavelength components of signal light are outputted from any of the plurality of input/output ports after passing the second optical system, wavelength branching means, and first optical system. As such, the multiplexed signal light is demultiplexed. When the light advances in the opposite direction, multiwavelength signal light components are multiplexed, and thus multiplexed signal light is outputted.

Here, the plurality of input/output ports included in the optical input/output means have respective optical input/output directions, in parallel with each other, located on the first virtual plane. The wavelength components of light outputted from the wavelength branching means after wavelength separation have respective optical axes located on the second virtual plane. The first and second virtual planes are not parallel to each other. The light collimated by the first optical system so as to be fed into the wavelength branching means has a greater beam width in a direction parallel to the second virtual plane than in a direction perpendicular to the second virtual plane. Such characteristic features allow the optical signal processor to improve its wavelength resolution and reduce its size.

Preferably, the wavelength branching means includes a diffraction grating device. Preferably, the first and second virtual planes are perpendicular to each other. Preferably, a line connecting a point where an optical axis of light fed from the first optical system into the wavelength branching means intersects the wavelength branching means and a point where an optical axis of light fed from the second optical system into the wavelength branching means intersects the wavelength branching means is perpendicular to the second virtual plane.

Preferably, any two mirrors included in the reflecting means have respective inclination angles of reflecting surfaces different from each other about a line, parallel to the second virtual plane and perpendicular to an optical axis of the second optical system, passing the light-converging point. Preferably, each mirror included in the reflecting means has a reflecting surface with an inclination angle variable about a line, parallel to the second virtual plane and perpendicular to an optical axis of the second optical system, passing the light-converging point.

Preferably, the optical signal processor further comprises polarization separating means and polarization plane rotating means. The polarization separating means is disposed between the input/output means and the wavelength branching means. The polarization separating means separates the light fed into any of the plurality of input/output ports into respective polarized light components having first and second directions orthogonal to each other in terms of polarization, and outputs a first light beam of the polarized light component having the first direction and a second light beam of the polarized light component having the second direction. The polarization plane rotating means is disposed between the polarization separating means and the wavelength branching means. The polarization plane rotating means receives any of the first and second light beams outputted from the polarization separating means, rotates a polarization direction of the received light beam to make the first and second light beams have the same polarization direction yielding the highest wavelength branching efficiency in the wavelength branching means, and outputs thus rotated light beam. Preferably, a line connecting a point where an optical axis of the first light beam fed from the first optical system into the wavelength branching means intersects the wavelength branching means and a point where an optical axis of the second light beam fed from the first optical system into the wavelength branching means intersects the wavelength branching means is parallel to the second virtual plane. Preferably, a line connecting a point where an optical axis of the first light beam fed from the first optical system into the wavelength branching means intersects the wavelength branching means and a point where an optical axis of the second light beam fed from the second optical system into the wavelength branching means intersects the wavelength branching means is perpendicular to the second virtual plane. In this case, the loss upon demultiplexing or multiplexing is low, and the polarization-dependent loss is small.

Preferably, mirrors included in the reflecting means have respective reflecting surfaces with the same inclination angle about a line, perpendicular to the second virtual plane, passing the light-converging point.

Preferably, each mirror included in the reflecting means has a reflecting surface with an inclination angle variable in N stages, whereas the optical input/output means includes N+1 input/output ports (N being an integer of 2 or greater). This is preferable for realizing an optical demultiplexer or optical multiplexer.

Preferably, each mirror included in the reflecting means has a reflecting surface with an inclination angle variable in N stages, whereas the optical input/output means includes 2N input/output ports (N being an integer of 2 or greater). This is preferable for realizing an optical ADM.

Preferably, the optical input/output means comprises a common input port, a common output port, an n-th channel input port, and an n-th channel output port. Preferably, the n-th channel input port and n-th channel output port input or output signal light in the same channel. Preferably, the number of input/output ports located between the common input port and the n-th channel input port is identical to the number of input/output ports located between the common output port and the n-th channel output port.

Preferably, in the optical signal processor in accordance with the present invention, the common input port and the common output port are adjacent to each other, whereas the n-th channel input port and the n-th channel output port are adjacent to each other.

Preferably, in the optical signal processor in accordance with the present invention, a line of intersection between the reflecting surface of each mirror included in the reflecting means and a plane, parallel to the second virtual plane, including the light-converging point, is a curve in an area including a center position of the light-converging point. Preferably, the curve has a variable curvature.

The present invention will become more fully understood from the detailed description given hereinbelow and the accompanying drawings. They are given by way of illustration only, and thus should not be considered limitative of the present invention.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions. For convenience of explanation, an xyz orthogonal coordinate system is shown in each drawing. The y axis in the xyz orthogonal coordinate system is parallel to the optical axis of a first optical system disposed between an input/output port and a diffraction grating device. The y axis is parallel to the optical axis of a second optical system disposed between the diffraction grating device and a mirror. The z axis in the xyz orthogonal coordinate system is common in the first and second optical systems.

Figure 1A:
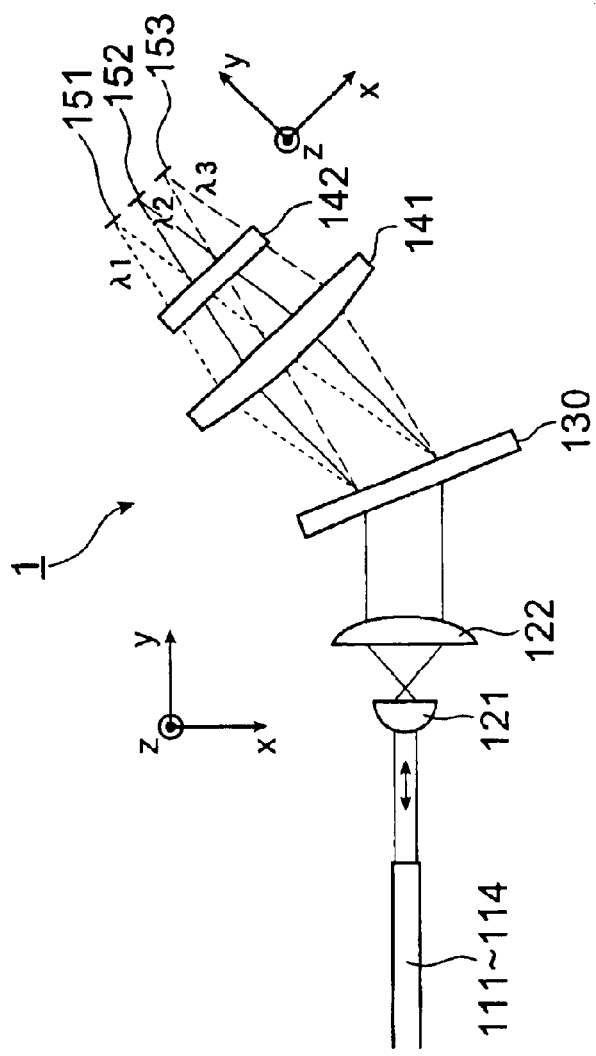
FIGS. 1A and 1B are schematic diagrams of the optical signal processor in accordance with a first embodiment.
Figure 1B:
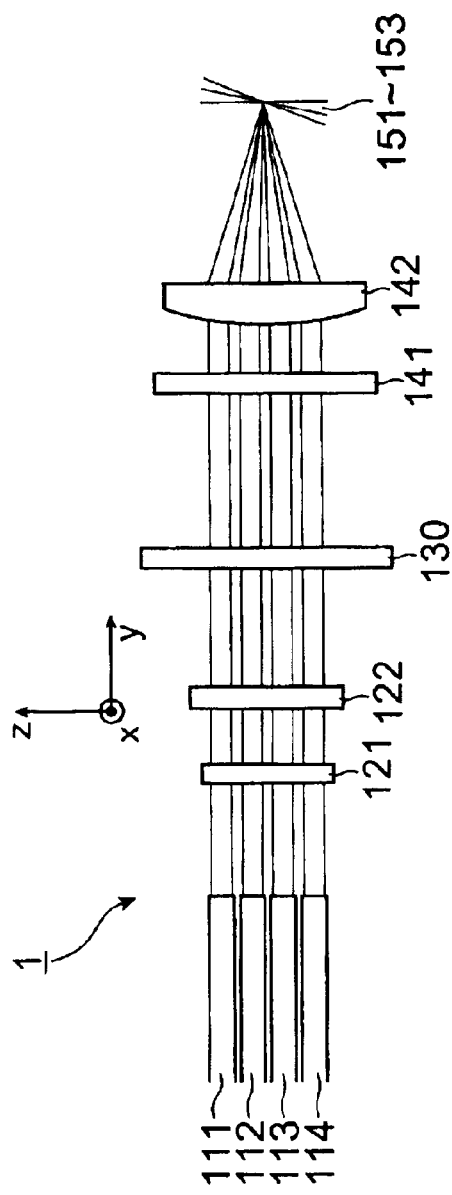

To begin with, the first embodiment of the optical signal processor in accordance with the present invention will be explained. FIG. 1A is a view of the optical signal processor 1 as seen in a direction parallel to the z axis. FIG. 1B is a view of the optical signal processor 1 as seen in a direction parallel to the x axis. The optical signal processor 1 shown in these drawings comprises input/output ports 111 to 114, lenses 121, 122, a diffraction grating device 130, lenses 141, 142, and mirrors 151 to 153.

Each of the input/output ports 111 to 114 constitutes optical input/output means for inputting or outputting light into or from the optical signal processor 1. The input/output ports 111 to 114 have respective light input/output directions, located on a first virtual plane (a plane parallel to the yz plane), parallel to each other. Namely, when any of the input/output ports 111 to 114 is used for inputting, the optical axis of light directed from this input/output port to the lens 121 is parallel to the y axis. When any of the input/output ports 111 to 114 is used for outputting, the optical axis of light directed from the lens 121 to the input/output port is parallel to the y axis. The respective optical axes of light beams between the input/output ports 111 to 114 and the lens 121 are located on the first virtual plane. Preferably, each of the input/output ports 111 to 114 is an optical fiber collimator in which an end face of an optical fiber has a lens function.

The lenses 121, 122 constitute a first optical system for collimating light arriving from any of the input/output ports 111 to 114, and outputting thus collimated light to the diffraction grating device 130. Each of the lenses 121, 122 is a cylindrical lens, and exhibits a light-converging effect only in directions parallel to the y axis. The lens 122 on the downstream stage (farther from the input/output port) has a focal length longer than that of the lens 121 on the upstream stage (closer to the input/output port). The gap between the lenses 121, 122 is set equal to the sum of their focal lengths. As a consequence, the light outputted from the first optical system comprising the lenses 121, 122 after collimation attains a greater beam width in a direction parallel to the x axis than in a direction parallel to the z axis.

The diffraction grating device 130 acting as wavelength branching means is of transmission type. The diffraction grating device 130 inputs the light arriving after being collimated by the first optical system, and diffracts individual wavelength components included in thus inputted light at respective diffraction angles corresponding to the wavelengths, so as to separate the wavelength light components spatially in terms of wavelength and output them to the lens 141. The diffraction grating device 130 is arranged such that its grating direction is parallel to the z axis. Therefore, when the optical axis of light incident on the diffraction grating device 130 is parallel to the y axis, the optical axes of wavelength light components outputted from the diffraction grating device 130 after wavelength separation are located on a second virtual plane (a plane parallel to the xy plane).

The lenses 141, 142 constitute a second optical system for converging the individual wavelength light components outputted from the diffraction grating device 130 after wavelength separation. Each of the lenses 141, 142 is a cylindrical lens. The lens 141 on the upstream side exhibits a light-converging effect only in directions parallel to the x axis. The lens 142 on the downstream side exhibits a light-converging effect only in directions parallel to the z axis. Light-converging points formed by the lenses 141, 142 are located on reflecting surfaces of the mirrors 151 to 153. As a consequence, the light converged by the second optical system comprising the lenses 141, 142 is focused onto the reflecting surfaces of the mirrors 151 to 153. If the lenses 141, 142 have no chromatic aberration, the light-converging points of individual wavelength light components exist on a line parallel to the x axis.

The mirrors 151 to 153 constitute reflecting means having respective reflecting surfaces at the light-converging points of individual wavelength light components converged by the second optical system, and reflecting the wavelength light components at the reflecting surfaces. Each of the mirrors 151 to 153 has a reflecting surface whose inclination angle is appropriately set. As a consequence, the individual wavelength light components reflected by the reflecting surfaces are outputted from any of the input/output ports 111 to 114 by way of the second optical system (lenses 142, 141), diffraction grating device 130, and first optical system (lenses 122, 121).

The first and second virtual planes are not parallel to each other but perpendicular to each other in this embodiment in particular. The light fed into the diffraction grating device 130 after being collimated by the first optical system has a greater beam width in a direction parallel to the second virtual plane (a direction parallel to the x axis) than in a direction perpendicular to the second virtual plane (a direction parallel to the z axis).

A line connecting a point where the optical axis of light fed from the first optical system into the diffraction grating device 130 intersects the diffraction grating device 130 and a point where the optical axis of light fed from the second optical system into the diffraction grating device 130 is parallel to the z axis and perpendicular to the second virtual plane.

The mirrors 151 to 153 have respective reflecting surfaces with the same inclination angle about a line (parallel to the z axis), perpendicular to the second virtual plane, passing the light-converging point. Preferably, any two of the mirrors 151 to 153 have reflecting surfaces with different inclination angles about a line (parallel to the x axis), parallel to the second virtual plane and perpendicular to the optical axis of the second optical system, passing the light-converging point. The inclination angle of the reflecting surface in each of the mirrors 151 to 153 may be fixed or variable. In the latter case, the inclination angle of the reflecting surface in each of the mirrors 151 to 153 is variable about a line (parallel to the x axis), parallel to the second virtual plane and perpendicular to the optical axis of the second optical system, passing the light-converging point.

In response to the four input/output ports provided, the inclination angle of the reflecting surface in each of the mirrors 151 to 153 can be changed in three stages whose number is smaller than the number of input/output ports by 1. Namely, the inclination angle of the reflecting surface in each mirror is variable in N stages, whereas N+1 input/output ports are provided in response thereto. Here, N is an integer of 2 or greater in general, and 3 in this embodiment. Thus configured optical signal processor 1 is operable as an optical demultiplexer or optical multiplexer.

Operations of the optical system 1 in accordance with the first embodiment will now be explained. In the following explanation, it is assumed that three wavelength signal light components $\lambda_1$ to $\lambda_3$ are multiplexed, and that thus multiplexed signal light is fed into the input/output port 111. Also, the mirrors 151 to 153 are assumed to reflect the signal light components $\lambda_1$ to $\lambda_3$, respectively.

The multiplexed signal light components $\lambda_1$ to $\lambda_3$ fed from the input/output port 111 are collimated by the first optical system constituted by the lenses 121, 122, so as to be made incident on the diffraction grating device 130. Here, because of the effect of the first optical system, the light incident on the diffraction grating device 130 enhances its beam width only in a direction parallel to the second virtual plane (a direction parallel to the x axis). The multiplexed signal light components $\lambda_1$ to $\lambda_3$ incident on the diffraction grating device 130 from the first optical system are diffracted by the diffraction grating device 130 at respective diffraction angles corresponding to the wavelengths, so as to be spatially separated in terms of wavelength. The multiplexed signal light components $\lambda_1$ to $\lambda_3$ separated in terms of wavelength by the diffraction grating device 130 are converged within a plane parallel to the xy plane by the lens 141, and are converged within a plane parallel to the yz plane by the lens 142, so as to be focused onto the reflecting surface in any of the mirrors 151 to 153.

The signal light component $\lambda_1$ collected by the second optical system is reflected by the mirror 151 having a reflecting surface at the light-converging point of signal light component $\lambda_1$. The signal light component $\lambda_1$ diverges immediately after reflection. However, since the inclination of the reflecting surface in the mirror 151 is set appropriately, the signal light component $\lambda_1$ is collimated by the second optical system (lenses 142, 141), diffracted by the diffraction grating device 130, and then outputted from any of the input/output ports 111 to 114 with its beam width reduced in a direction parallel to the second virtual plane (a direction parallel to the x axis). In a similar manner, the signal light components $\lambda_2$ and $\lambda_3$ converged by the second optical system are processed. The signal light component $\lambda_2$ reflected by the mirror 152 is outputted from any of the input/output ports 111 to 114. The signal light component $\lambda_3$ reflected by the mirror 153 is outputted from any of the input/output ports 111 to 114.

The respective projections of the outgoing path (optical path directed from the input/output port to the mirror) and the incoming path (optical path directed from the mirror to the input/output port) onto the xy plane coincide with each other at the same wavelength. Between the input/output ports 111 to 114 and the lens 142, the signal light components $\lambda_1$ to $\lambda_3$ also advance in parallel with the y axis on the first virtual plane (plane parallel to the yz plane) in the incoming path as in the outgoing path.

Which input/output ports the signal light components $\lambda_1$ to $\lambda_3$ reach after traveling the incoming path is determined by the inclination angle of the reflecting surface in each of the mirrors 151 to 153. For example, the signal light components $\lambda_1$ to $\lambda_3$ having traveled the incoming path can reach the input/output ports 112, 113, 114, respectively. In this case, the optical signal processor 1 operates as an optical demultiplexer for demultiplexing the inputted multiplexed signal light components $\lambda_1$ to $\lambda_3$ into the individual wavelengths, and outputting thus demultiplexed wavelength components. When the signal light components $\lambda_1$ to $\lambda_3$ are fed into the input ports 112, 113, 114, respectively, these signal light components travel the opposite optical paths, so as to be outputted from the input/output port 111 after being multiplexed. In this case, the optical signal processor 1 operates as an optical multiplexer for multiplexing the individually inputted signal light components $\lambda_1$ to $\lambda_3$, and outputting thus multiplexed signal light.

Also, for example, the signal light components $\lambda_1$ and $\lambda_2$ having traveled the incoming path can reach the input/output port 113 whereas the signal light component $\lambda_3$ having traveled the incoming path can reach the input/output port 114. When the signal light components $\lambda_1$ and $\lambda_2$ reach the input/output port 113 whereas the signal light component $\lambda_3$ reaches the input/output port 114, these signal light components travel their opposite paths, so as to be outputted from the input/output port 111 after being multiplexed. The optical signal processor 1 also operates as an optical demultiplexer or optical multiplexer for demultiplexing or multiplexing the signal light components $\lambda_1$ to $\lambda_3$ in these cases.

In the light incident on the diffraction grating device 130 from the first optical system, the beam width in a direction parallel to the x axis is enlarged by the first optical system in this embodiment. Therefore, the light-converging point of each wavelength component of signal light converged by the second optical system after being outputted from the diffraction grating device 130 is sharp and has a small size. The optical signal processor 1 in accordance with this embodiment has such a high degree of convergence, and thus attains a high wavelength resolution. Though the beam width of light incident on the diffraction grating device 130 is enlarged in one direction, the light-converging point can be made smaller in the reflecting surface of each of the mirrors 151 to 153, whereas the beam diameter can be made smaller at the time of inputting or outputting light in each of the input/output ports 111 to 114. Therefore, the optical signal processor 1 in accordance with this embodiment can be made smaller.

As mentioned above, the inclination angle of the reflecting surface in each of the mirrors 151 to 153 is preferably variable. Such mirrors 151 to 153 can be made smaller by using the MEMS (Micro Electro Mechanical System) technology. For example, it is possible to realize one having a size of several tens of micrometers, which can be driven two-dimensionally. When using the MEMS technology, a mirror is realized in the following manner.

First, a pattern is formed by photolithography with a submicron precision on a substrate made of Si or SOI, and a desirable structure is formed by reactive etching. After the formation, a plurality of structures are bonded together in the case of the Si substrate. In the case of the SOI substrate, the structure is made movable after a sacrifice layer removing process, whereby a driver for driving a mirror is formed. Signal light generally employed in optical communications falls within an infrared region, whereas Si is transparent to infrared light. Therefore, a mirror comprises a base made of chromium and a coating layer of gold formed thereon. Here, in order for the gold coating layer to sufficiently block the light in a wavelength region generally used in optical communications, the gold coating layer preferably has a thickness of about 0.1 μm or greater. Examples of mechanism for driving a mirror include those using a hinge and a thin spring-like member. Such a driving mechanism realizes a mirror adapted to adjust the inclination angle by several degrees on a flat substrate.

It is necessary to assemble a structure in which a plurality of mirrors are arranged as with the mirrors 151 to 153 included in the optical signal processor 1 in accordance with this embodiment. MEMS chips are often subjected to dicing in general, which may be problematic in terms of the perpendicularity of cross sections and the accuracy in cut positions. Preferably, the anisotropy of Si crystals is utilized, so as to form vertical planes by wet etching. It will also be preferred if vertical planes are formed by deep reactive ion etching.

Figure 2:
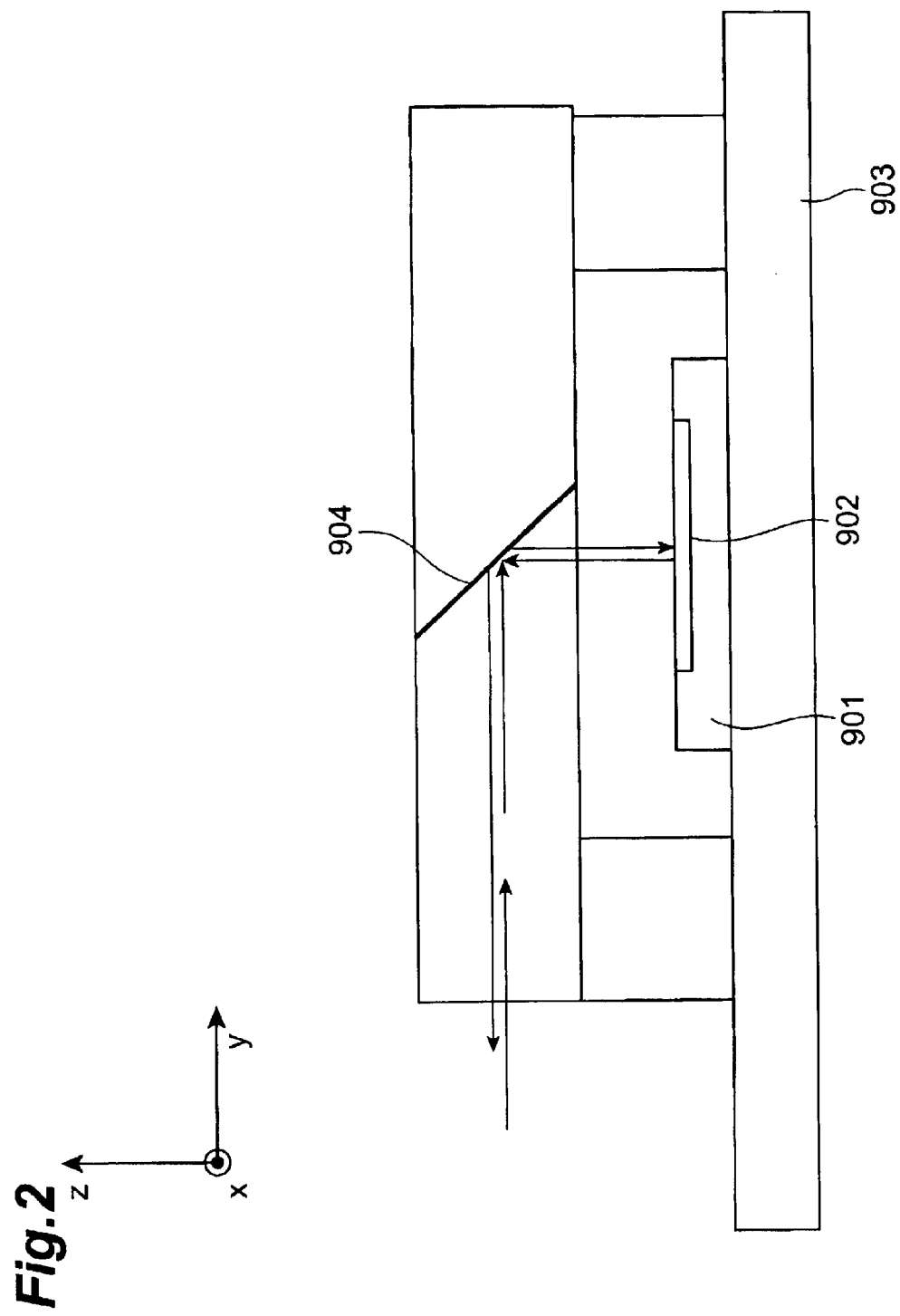
FIG. 2 is a sectional view of a MEMS substrate, mounted on a platform, realizing a mirror.

In another preferable mirror arranging structure, a platform mounting the wavelength branching means and a platform mounting a MEMS substrate are arranged in parallel with each other. FIG. 2 is a sectional view of a structure in which a MEMS substrate realizing a mirror is mounted on a platform. As shown in this sectional view, a mirror 902 is realized on one surface of a MEMS substrate 901. The other surface of the MEMS substrate 901 is secured onto a surface of a flat platform 903. A mirror 904 is disposed above the mirror 902. The mirror 902 corresponds to the mirrors 151 to 153 in FIGS. 1A and 1B, whereas a normal of its reflecting surface is parallel to the z axis. The mirror 904 inputs light incident thereon in parallel with the y axis from the second optical system, and reflects the light into a direction parallel to the z axis, so as to output the reflected light toward the mirror 902. The mirror 904 maybe realized by a prism as well. In such a configuration, the MEMS substrate 901 and platform 903 theoretically have quite favorable thicknesses and parallelism, whereby there is no need to take account of the alignment accuracy in directions parallel to the z axis. Also, the mirror (or prism) 904 can easily be formed by using LIGA (Lithographic Galvanoforming Abforming; lithography utilizing synchrotron orbital radiation).

Figure 3:
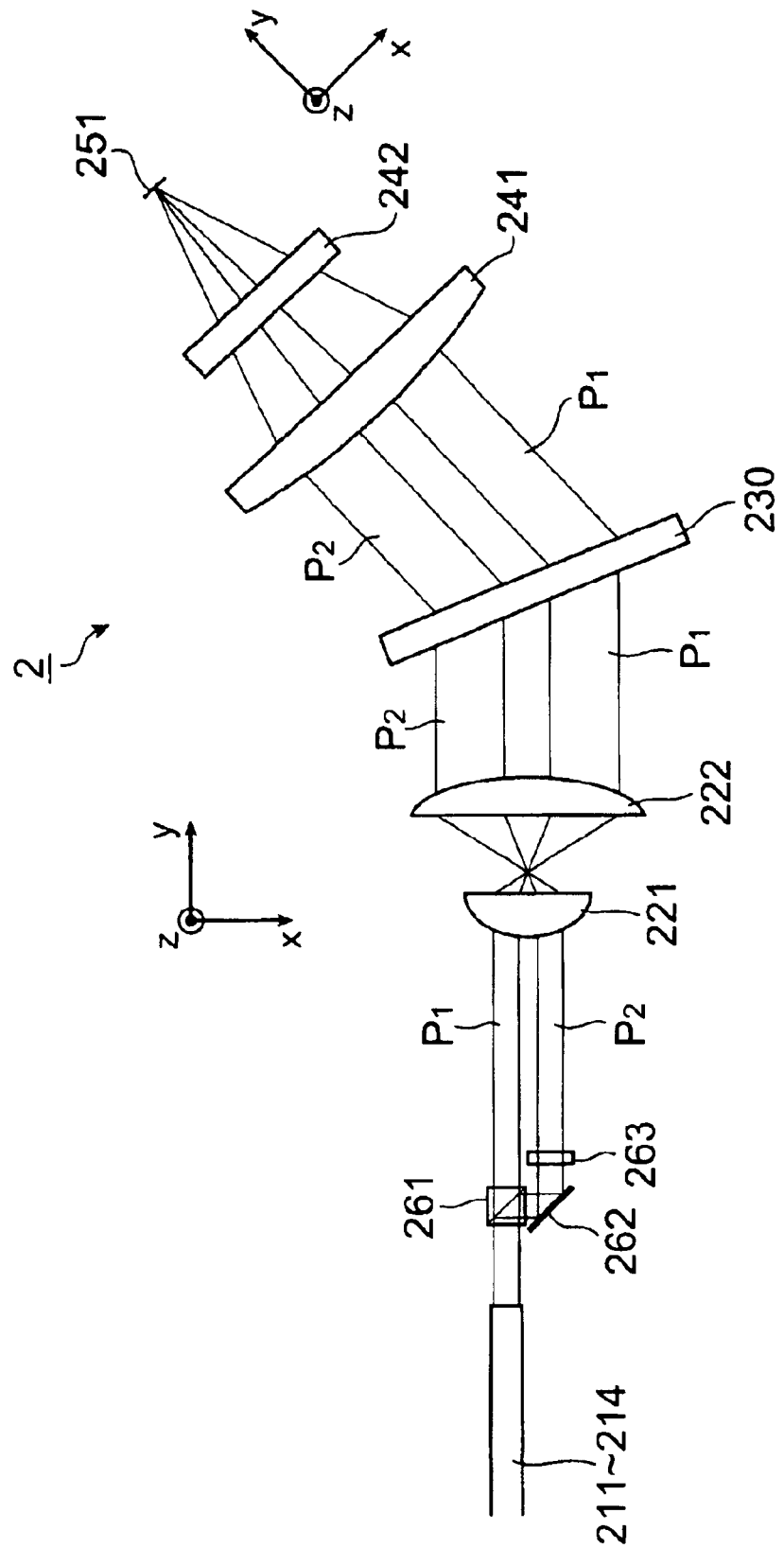
FIG. 3 is a schematic diagram of the optical signal processor in accordance with a second embodiment.

A second embodiment of the optical signal processor in accordance with the present invention will now be explained. FIG. 3 is a schematic diagram of the optical signal processor 2 in accordance with the second embodiment. This diagram shows the optical signal processor 2 as seen in a direction parallel to the z axis. The diagram of the optical signal processor 2 as seen in a direction parallel to the x axis is substantially the same as FIG. 1B and thus is omitted.

The optical signal processor 2 shown in FIG. 3 comprises input/output ports 211 to 214, lenses 221, 222, a diffraction grating device 230, lenses 241, 242, and mirrors 251 to 253. These constituents are equivalent to those included in the optical signal processor 1 in accordance with the first embodiment shown in FIGS. 1A and 1B. For simplification, this diagram shows only the mirror 251 among the mirrors 251 to 253, and only the optical path of signal light converged onto the reflecting surface of the mirror 251.

The optical signal processor 2 in accordance with the second embodiment further comprises a polarization beam splitter 261, a mirror 262, and a half-wave plate 263 which are disposed between the input/output ports 211 to 214 and the lens 221.

The polarization beam splitter 261 acts as polarization separating means. Namely, the polarization beam splitter 261 receives light from any of the input/output ports 211 to 214, and separates the light in terms of polarization into respective polarized light components having first and second directions orthogonal to each other. Then, the polarization beam splitter 261 outputs a first light beam of the polarized light component having the first direction into the first optical path $P_1$, and a second light beam of the polarized light component having the second direction into the second optical path $P_2$. The first direction is a polarization direction yielding the highest diffraction efficiency in the diffraction grating device 230. The second direction is a polarization direction orthogonal to the first direction. Immediately after the first light beam is outputted from the polarization beam splitter 261, the first optical path $P_1$ is parallel to the y axis. Immediately after the second light beam is outputted from the polarization beam splitter 261, the second optical path $P_2$ is parallel to the x axis.

The mirror 262 is disposed on the second optical path $P_2$ between the polarization beam splitter 261 and the lens 221. The mirror 262 reflects the second light beam outputted into the second optical path $P_2$ from the polarization beam splitter 261, and outputs thus reflected second light beam into a direction parallel to the y axis. The half-wave plate 263 acts as polarization plane rotating means. Namely, the half-wave plate 263 is disposed on the second optical path $P_2$ between the mirror 262 and the lens 221. The half-wave plate 263 receives the second light beam outputted to the second optical path $P_2$ from the mirror 262, rotates the polarization direction of the second light beam by 90° so as to attain the first polarization direction, and outputs the second light beam having the first polarization direction into the second optical path $P_2$.

The first light beam outputted from the polarization beam splitter 261 to the first optical path P1 is immediately collimated by the first optical system (lenses 221, 222), so as to be fed into the diffraction grating device 230 in a direction parallel to the y axis. In the second light beam outputted from the polarization beam splitter 261 to the second optical path $P_2$, the polarization direction is rotated by 90° by the half-wave plate 263. Then, the second light beam is collimated by the first optical system (lenses 221, 222), so as to be fed into the diffraction grating device 230 in a direction parallel to the y axis. Thus, each of the first and second light beams fed from the first optical system (lenses 221, 222) to the diffraction grating device 230 has the first polarization direction. Therefore, the first and second light beams are diffracted at a high efficiency by the diffraction grating device 230.

As in the first embodiment, the respective optical input/output directions of the input/output ports 211 to 214 are located on the first virtual plane (plane parallel to the yz plane) and are parallel to each other in the second embodiment. The individual wavelength light components (in both the first optical path $P_1$ and second optical path $P_2$) outputted from the diffraction grating device 230 after wavelength separation have respective optical axes located on the second virtual plane (plane parallel to the xy plane). The first and second virtual planes are perpendicular to each other. The light incident on the diffraction grating device 230 after being collimated by the first optical system (in both the first optical path $P_1$ and second optical path $P_2$) has a greater beam width in a direction parallel to the second virtual plane (a direction parallel to the x axis) than the beam width in a direction perpendicular to the second virtual plane (a direction parallel to the z axis).

In the second embodiment, a line connecting a point where the optical axis of the first light beam (optical axis of the first optical path $P_1$) fed from the first optical system into the diffraction grating device 230 intersects the diffraction grating device 230 and a point where the optical axis of the second light beam (optical axis of the second optical path $P_2$) fed from the first optical system into the diffraction grating device 230 intersects the diffraction grating device 230 is parallel to the second virtual plane (plane parallel to the xy plane).

In the second embodiment, the first and second light beams fed from the first optical system (lenses 221, 222) into the diffraction grating device 230 are inputted to the diffraction grating device 230 in a direction parallel to the y axis and are diffracted at the same diffraction angle by the diffraction grating device 230. Thus diffracted first and second light beams advance in parallel with each other from the diffraction grating device 230 toward the lens 241, and are converged at the same light-converging point on the reflecting surface of the mirror 251.

The first and second light beams diverge immediately after being reflected by the mirror 251, but are collimated by the second optical system (lenses 242, 241) and are diffracted by the diffraction grating device 230. Then, the beam width of each light beam in a direction parallel to the second virtual plane (a direction parallel to the x axis) is reduced by the first optical system (lenses 222, 221). Thereafter, the first and second light beams are combined in terms of polarization by the half-wave plate 263 and polarization beam splitter 261, and thus combined light is outputted from any of the input/output ports 211 to 214.

In the second embodiment, a line connecting a point where the optical axis of the first light beam fed from the first optical system into the diffraction grating device 230 intersects the diffraction grating device 230 in the outgoing path and a point where the optical axis of the second light beam fed from the second optical system into the diffraction grating device 230 intersects the diffraction grating device 230 in the incoming path is parallel to the z axis and perpendicular to the second virtual plane (plane parallel to the xy plane). Namely, the projection of the outgoing path of the first light beam onto the xy plane and the projection of the incoming path of the second light beam onto the xy plane coincide with each other. Also, the projection of the outgoing path of the second light beam onto the xy plane and the projection of the incoming path of the first light beam onto the xy plane coincide with each other.

The second optical signal processor 2 in accordance with this embodiment can exhibit the following effects in addition to those obtained by the optical signal processor 1 in accordance with the first embodiment. Namely, since the second embodiment comprises the polarization beam splitter 261, mirror 262, and half-wave plate 263, the light incident on the diffraction grating device 230 always attains a polarization direction yielding the highest diffraction efficiency in the diffraction grating device 230. As a consequence, regardless of the polarization state of input light, the optical signal processor 2 yields a low loss at the time of demultiplexing or multiplexing, and a small polarization-dependent loss.

The reflecting surface of the mirror 251 has a variable inclination angle about a line (parallel to the x axis), parallel to the second virtual plane and perpendicular to the optical axis of the second optical system, passing the light-converging point. The same holds in the mirrors 252, 253. The mirrors 251 to 253 have respective reflecting surfaces having the same inclination angle about a line (parallel to the z axis), perpendicular to the second virtual plane, passing the light-converging point. For setting the inclination angle of the reflecting surface in each of the mirrors 251 to 253 as such, the respective optical axes of individual wavelength components of signal light are required to be parallel to each other from the lens 241 to each of the mirrors 251 to 253.

When the lens 241 is a thin lens, for example, the angle formed between the optical axis of light incident on the mirror 241 and the yz plane is represented by the following expression:

$$(1-L/f)\tan(\beta_0-\beta)-x_0/f \quad (1)$$

Here, $\lambda$ is represented by the following expression:

$$\lambda = \Lambda(\sin\beta_{in} - \sin\beta) \quad (2)$$

Here, L is the distance along the optical path from the diffraction grating device 230 to the lens 241. f is the focal length of the lens 241. $\Lambda$ is the grating period of the diffraction grating device 230. $\beta_{in}$ is the incident angle of light onto the diffraction grating device 230. $\beta$ is the diffraction angle of light having the wavelength $\lambda$ in the diffraction grating device 230. $\beta_0$ is the diffraction angle of light having a specific wavelength diffracted into a direction parallel to the optical axis of the lens 241. $x_0$ is the x-coordinate value of light having the above-mentioned specific wavelength on the lens 231 when the x-coordinate value of the center point of the lens 231 is taken as 0.

In order for the respective optical axes of individual wavelength components of signal light to become parallel to each other from the lens 241 to each of the mirrors 251 to 253, the incident angle represented by the above-mentioned expression (1) is independent from the wavelength $\lambda$. Namely, it will be sufficient if the relational expression:

$$f=L \quad (3)$$

holds. The second optical system can attain a configuration satisfying the relationship of the above-mentioned expression (3) even when having a complicated structure including a plurality of lenses.

Figure 4A:
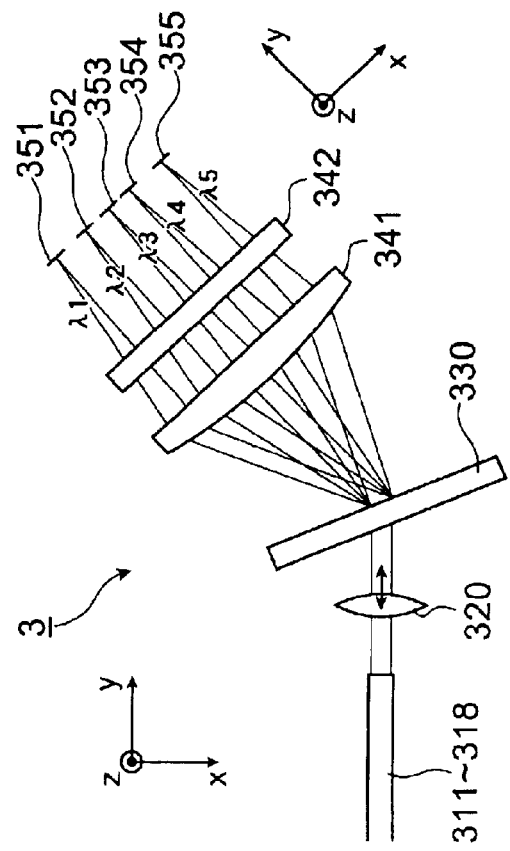
FIGS. 4A and 4B are schematic diagrams of the optical signal processor in accordance with a third embodiment.
Figure 4B:
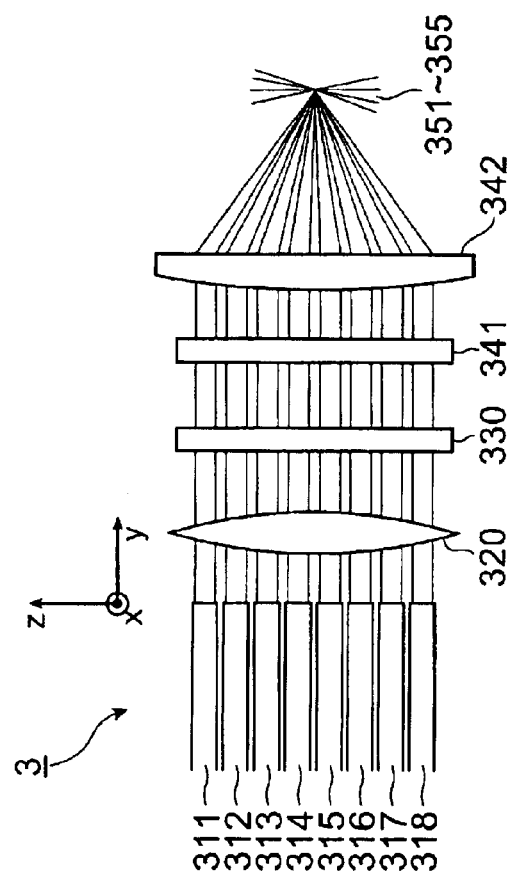

A third embodiment of the optical signal processor in accordance with the present invention will now be explained. FIGS. 4A and 4B are schematic diagrams of the optical signal processor 3 in accordance with the third embodiment. FIG. 4A is a diagram of the optical signal processor 3 as seen in a direction parallel to the z axis. FIG. 4B is a diagram of the optical signal processor 3 as seen in a direction parallel to the x axis.

The optical signal processor 3 shown in these diagrams comprises input/output ports 311 to 318, a first optical system 320, a diffraction grating device 330, lenses 341, 342, and mirrors 351 to 355. Though the first optical system 320 in this embodiment preferably has a configuration in which two cylindrical lenses are combined together as in each of the first and second embodiments, the configuration is depicted in a simplified form here.

The individual constituents included in the optical signal processor 3 shown in these diagrams are equivalent to those included in the optical signal processor 1 in accordance with the first embodiment shown in FIGS. 1A and 1B except for particulars concerning numbers thereof, and are arranged similarly to the optical signal processor 1. Therefore, operations and effects of the optical signal processor 3 are substantially the same as those of the optical signal processor 1 in accordance with the first embodiment.

Namely, as in the first embodiment, the input/output ports 311 to 318 have respective light input/output directions, located on the first virtual plane (plane parallel to the yz plane), parallel to each other. The individual wavelength light components outputted from the diffraction grating device 330 after wavelength separation have respective optical axes located on the second virtual plane (plane parallel to the xy plane). The first and second virtual planes are perpendicular to each other. The light incident on the diffraction grating device 330 after being collimated by the first optical system 320 has a greater beam width in a direction parallel to the second virtual plane (a direction parallel to the x axis) than in a direction perpendicular to the second virtual plane (a direction parallel to the z axis). Such a configuration allows the optical signal processor 3 in accordance with this embodiment to yield a high wavelength resolution and reduce its size.

The optical signal processor 3 in accordance with this embodiment comprises five mirrors 351 to 355 in response to eight input/output ports 311 to 318. The inclination angle of the reflecting surface in each of the mirrors 351 to 355 is changeable in four stages. Namely, the inclination angle of the reflecting surface in each mirror is changeable in N stages, and 2N input/output ports are provided in response thereto. Here, N is an integer of 3 or greater in general, and 4 in this embodiment. Thus configured optical signal processor 3 is operable not only as an optical demultiplexer or optical multiplexer, but also as an optical ADM. In the following, a case where the optical signal processor 3 operates as an optical ADM will be explained.

The eight input/output ports 311 to 318 are arranged in this order in a direction parallel to the z axis. It is assumed that the input/output port 313 is a common input port for inputting multiplexed signal light components $\lambda_1$ to $\lambda_5$, and that the input/output port 314 is a common output port for outputting multiplexed signal light components $\lambda_1$ to $\lambda_5$. It is also assumed that the five wavelength signal light components $\lambda_1$ to $\lambda_5$ are reflected by the mirrors 351 to 355, respectively.

The remaining six input/output ports 311, 312, 315 to 318 are ports for adding or dropping any of the five wavelength signal light components $\lambda_1$ to $\lambda_5$. In particular, each of the input/output ports 311, 315, 317 is an input port for adding the signal light, whereas each of the input/output ports 312, 316, 318 is an output port for dropping the signal light. The respective inclination angles of the reflecting surfaces in the mirrors 351 to 355 are set appropriately according to which input/output ports are to be used for adding or dropping.

The multiplexed signal light components $\lambda_1$ to $\lambda_5$ fed from the common input port 313 are collimated by the first optical system 320, so as to be made incident on the diffraction grating device 330. Here, because of the effect of the first optical system 320, the light incident on the diffraction grating device 330 enhances its beam width only in a direction parallel to the second virtual plane (a direction parallel to the x axis). The multiplexed signal light components $\lambda_1$ to $\lambda_5$ incident on the diffraction grating device 330 from the first optical system 320 are diffracted by the diffraction grating device 330 at respective diffraction angles corresponding to the wavelengths, so as to be separated spatially in terms of wavelength. The signal light components $\lambda_1$ to $\lambda_5$ separated in terms of wavelength by the diffraction grating device 330 are converged within a plane parallel to the xy plane by the lens 341, and are converged within a plane parallel to the yz plane by the lens 342, so as to be converged onto any of the reflecting surfaces of the mirrors 351 to 355.

The signal light component $\lambda_1$ converged by the second optical system is reflected by the mirror 351 whose reflecting surface is located at the light-converging point of the signal light component $\lambda_1$. The inclination of the reflecting surface of the mirror 351 is set appropriately. Therefore, though diverging immediately after being reflected, the signal light component $\lambda_1$ reflected by the mirror 351 is collimated by the second optical system (lenses 342, 341) and then diffracted by the diffraction grating device 330. Thereafter, with the beam width reduced in a direction parallel to the second virtual plane (a direction parallel to the x axis) by the first optical system 320, the signal light component $\lambda_1$ is outputted from any of the common output port 314 and the output ports 312, 316, and 318. The signal light components $\lambda_2$ to $\lambda_5$ converged by the second optical system are processed similarly, so that the signal light components $\lambda_2$ to $\lambda_5$ reflected by the mirrors 352 to 355 are outputted from any of the common output port 314 and the output ports 312, 316, and 318.

For example, in the multiplexed signal light components $\lambda_1$ to $\lambda_5$ fed into the common input port 313, the signal light component $\lambda_1$ is outputted from the output port 318, the signal light component $\lambda_2$ is outputted from the output port 316, the signal light components $\lambda_3$, $\lambda_4$ are outputted from the common output port 314, and the signal light component $\lambda_5$ is outputted from the output port 312. Here, the signal light components $\lambda_1$, $\lambda_2$, $\lambda_5$ fed into the input ports 317, 315, 311, respectively, are outputted from the common output port 314 after being multiplexed with the signal light components $\lambda_3$, $\lambda_4$ fed into the common input port 313. By appropriately setting the inclination angle of each of the reflecting surfaces of the mirrors 351 to 355, the optical signal processor 3 in accordance with this embodiment can set the signal light wavelengths and input/output port positions to be added or dropped, and thus can operate as a three-channel variable optical ADM.

When the optical signal processor 3 operates as an optical ADM as such, it is necessary for the incident angle of light from the common input port 313 and the reflection angle of the light directed to the output port for dropping the signal light component $\lambda_n$ to equal each other in the mirror for reflecting the signal light component $\lambda_n$. Also, in the mirror for reflecting the signal light component $\lambda_n$, it is necessary for the incident angle of light from the input port for adding the signal light component $\lambda_n$ and the reflection angle of the light directed to the common output port 314 to equal each other. To this aim, it is desirable that the number of input/output ports located between the common input port 313 and the input port for the signal light component $\lambda_n$ and the number of input/output ports located between the common output port 314 and the output port for the signal light component $\lambda_n$ equal each other. Preferably, the common input port 313 and the common output port 314 are adjacent to each other, whereas the input port for the signal light component $\lambda_n$ and the output port for the signal light component $\lambda_n$ are adjacent to each other. The input/output ports 311 to 318 satisfy such relationships in the explanation of operations mentioned above.

Figure 5:
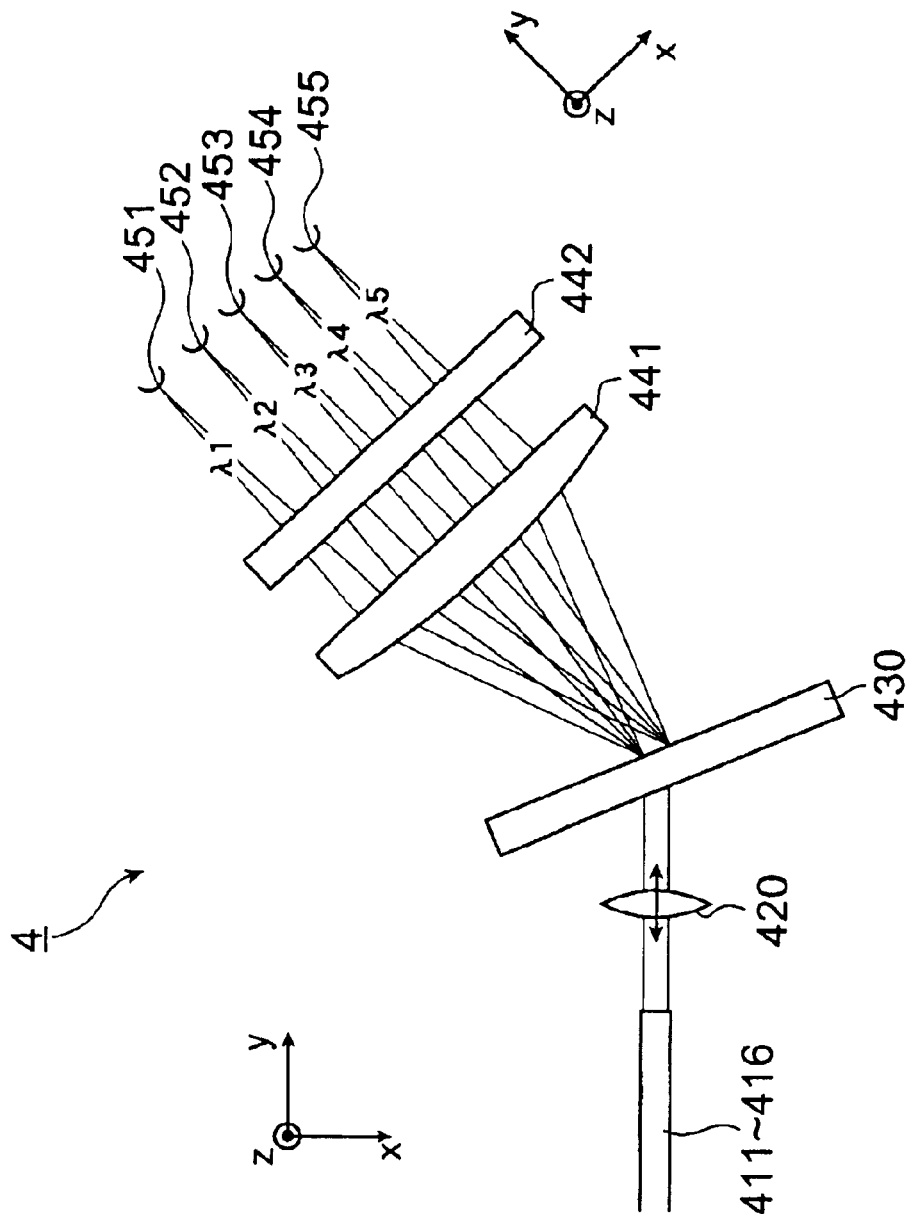
FIG. 5 is a schematic diagram of the optical signal processor in accordance with a fourth embodiment.

A fourth embodiment of the optical signal processor in accordance with the present invention will now be explained. FIG. 5 is a schematic diagram of the optical signal processor 4 in accordance with the fourth embodiment. This diagram shows the optical signal processor 4 as seen in a direction parallel to the z axis. The diagram of the optical signal processor 4 as seen in a direction parallel to the x axis is substantially the same as FIG. 1B and thus is omitted.

The optical signal processor 4 shown in FIG. 5 comprises input/output ports 411 to 416, a first optical system 420, a diffraction grating device 430, lenses 441, 442, and mirrors 451 to 455. Though the first optical system 420 in this embodiment preferably has a configuration in which two cylindrical lenses are combined together as in each of the first and second embodiments, the configuration is depicted in a simplified form here.

The individual constituents included in the optical signal processor 4 shown in these diagrams are equivalent to those included in the optical signal processor 1 in accordance with the first embodiment shown in FIGS. 1A and 1B except for particulars concerning numbers thereof, and are arranged similarly to the optical signal processor 1. Therefore, operations and effects of the optical signal processor 4 are substantially the same as those of the optical signal processor 1 in accordance with the first embodiment.

Namely, as in the first embodiment, the input/output ports 411 to 416 have respective light input/output directions, located on the first virtual plane (plane parallel to the yz plane), parallel to each other. The individual wavelength light components outputted from the diffraction grating device 430 after wavelength separation have respective optical axes located on the second virtual plane (plane parallel to the xy plane). The first and second virtual planes are perpendicular to each other. The light incident on the diffraction grating device 430 after being collimated by the first optical system 420 has a greater beam width in a direction parallel to the second virtual plane (a direction parallel to the x axis) than in a direction perpendicular to the second virtual plane (a direction parallel to the z axis). Such a configuration allows the optical signal processor 3 in accordance with this embodiment to yield a high wavelength resolution and reduce its size.

The optical signal processor 4 in accordance with this embodiment comprises five mirrors 451 to 455 in response to six input/output ports 411 to 416. The inclination angle (the angle of inclination about a line parallel to the x axis) of the reflecting surface in each of the mirrors 451 to 455 is changeable in five stages. Namely, the inclination angle of the reflecting surface in each mirror is changeable in N stages, and N+1 input/output ports are provided in response thereto. Here, N is an integer of 2 or greater in general, and 5 in this embodiment. Thus configured optical signal processor 4 is operable as an optical demultiplexer or optical multiplexer, as in the first embodiment.

In particular, each of the reflecting surfaces of the mirrors 451 to 455 is formed as a curved surface in the fourth embodiment. Namely, in each of the mirrors 451 to 455, a line of intersection between a plane (parallel to the xy plane), parallel to the second virtual plane, including the light-converging point and the reflecting surface is a curve in an area including the center position of the light-converging point. Preferably, the curve has a variable curvature.

Thus, each of the reflecting surfaces of the mirrors 451 to 455 is formed as a curved surface. Therefore, the optical signal processor 4 in accordance with this embodiment can adjust the chromatic dispersion when operating as an optical demultiplexer or optical multiplexer. While signal light is incident on the light-converging point on the reflecting surface in each of the mirrors 451 to 455, the signal light has a certain degree of wavelength expansion in general, so that the center wavelength component of signal light is incident at the center position of the light-converging point, whereas wavelength components distanced from the center wavelength are incident at positions separated from the center position. Since the reflecting surface is formed as a curved surface, the signal incident on and reflected by the reflecting surface incurs a group delay corresponding to the wavelength, whereby the chromatic dispersion is adjusted. When the curved surface form of the reflecting surface is variable, the chromatic dispersion adjustment amount also becomes variable.

Figure 6A:
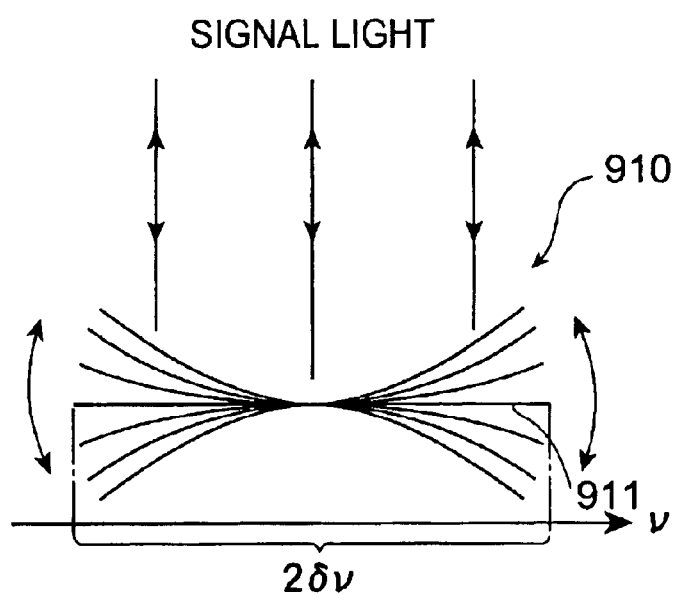
FIGS. 6A and 6B are explanatory views of a mirror having a reflecting surface with a variable curved surface form.
Figure 6B:
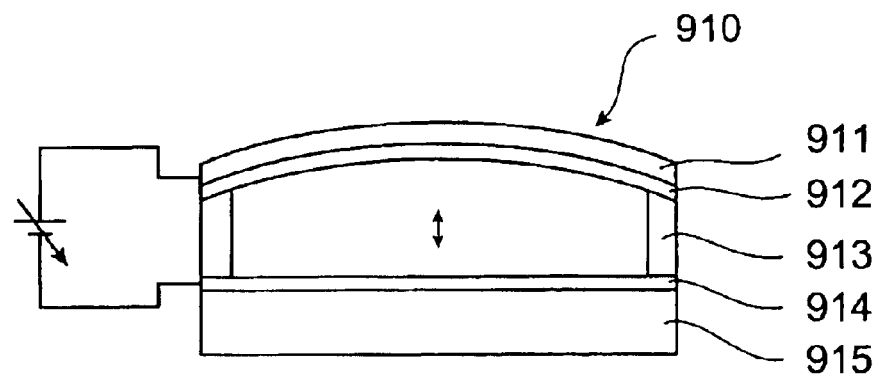

Such mirrors 451 to 455 can be realized in the following manner. FIGS. 6A and 6B are explanatory views of a mirror having a reflecting surface whose curved surface form is variable. FIG. 6A is a schematic view showing the form and driving method of the mirror, whereas FIG. 6B is a sectional view showing a specific example. The reflecting means 910 shown in these drawings comprises a single movable reflecting mirror 911. The movable reflecting mirror 911 corresponds to the mirrors 451 to 455 in FIG. 5.

As shown in FIG. 6A, by deforming the curved surface form of the whole reflecting surface (into a parabolic form, for example), the movable reflecting mirror 911 can move respective reflecting surface parts corresponding to individual frequency components of signal light with respect to the signal light propagating direction. This can accurately adjust dispersion in a variable manner.

FIG. 6B shows a specific configurational example of the reflecting means 910 having such a single movable reflecting mirror 911. In the reflecting means 910, a metal layer 911 to become a movable reflecting mirror is formed on a polysilicon layer 912. The metal layer 911 also functions as a first electrode provided with the movable mirror.

A metal layer 914 formed on a silicon layer 915 is disposed on the side of the polysilicon layer 912 opposite from the metal layer 911. The metal layer 914 is a second electrode disposed at a predetermined position with respect to the first electrode. The polysilicon layer 912 and the metal layer 914 are separated from each other by a silicon oxide layer 913. The silicon oxide layer 913 is disposed at end parts of the polysilicon layer 912 and metal layer 914.

A variable power supply for variably applying a voltage is connected between the metal layer 911 functioning as the movable reflecting mirror and acting as the first electrode, and the metal layer 914 acting as the second electrode. When the voltage applied between the metal layers 911 and 914 is changed, an electrostatic force occurs or changes, thereby forming flexure in the metal layer 911 and polysilicon layer 912 at the center part not provided with the silicon oxide layer 913. As a consequence, the curved surface form of the reflecting surface deforms, so that individual parts of the reflecting surface migrate.

Without being restricted to the above-mentioned embodiments, the present invention can be modified in various manners. For example, though the diffraction grating device acting as wavelength branching means is of transmission type in the above-mentioned embodiments, it may be of reflection type as well. Instead of the diffraction grating device, a photonic crystal may be used as the wavelength branching means. When multiplexed multi-wavelength signal light is inputted, the photonic crystal can output individual wavelength components of signal light into spatially different optical paths in response to the respective wavelengths. In this regard, the photonic crystal exhibits an effect similar to that of the diffraction grating device. The number of signal light channels, the number of input/output ports, and the number of mirrors are not restricted to those explained in the above-mentioned embodiments.

As explained in detail in the foregoing, the respective light input/output directions of a plurality of input/output ports included in the optical input/output means are located on the first virtual plane and parallel to each other in the present invention. The individual wavelength light components outputted from the wavelength branching means after wavelength separation have respective optical axes located on the second virtual plane. The first and second virtual planes are not parallel to each other. The light fed into the wavelength branching means after being collimated by the first optical system has a greater beam width in a direction parallel to the second virtual plane than in a direction perpendicular to the second virtual plane. Such characteristic features allow the optical signal processor in accordance with the present invention to improve its wavelength resolution and reduce its size.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical signal processor comprising:

optical input/output means including a plurality of input/output ports for inputting or outputting light; the plurality of input/output ports having respective light input/output directions, in parallel with each other, located on a first virtual plane; the optical input/output means inputting light into any of the plurality of input/output ports and outputting the light from any of the other input/output ports;

a first optical system for collimating the light arriving from any of the plurality of input/output ports, and outputting thus collimated light;

wavelength branching means for receiving the light collimated by the first optical system, spatially separating the light in terms of wavelength, and outputting thus obtained wavelength light components, thus outputted wavelength light components having respective optical axes located on a second virtual plane;

a second optical system for receiving the wavelength light components outputted from the wavelength branching means after wavelength separation, and converging the wavelength light components; and reflecting means including a mirror with a reflecting surface positioned at a light-converging point of the wavelength light components converged by the second optical system; the reflecting means causing the light reflected by the mirror to be outputted from any of the plurality of input/output ports by way of the second optical system, wavelength branching means, and first optical system;

wherein the first and second virtual planes are not parallel to each other; and wherein the light fed into the wavelength branching means after being collimated by the first optical system has a greater beam width in a direction parallel to the second virtual plane than in a direction perpendicular to the second virtual plane.

2. An optical signal processor according to claim 1, wherein the wavelength branching means includes a diffraction grating device.

3. An optical signal processor according to claim 1, wherein the first and second virtual planes are perpendicular to each other.

4. An optical signal processor according to claim 3, wherein a line connecting a point where an optical axis of light fed from the first optical system into the wavelength branching means intersects the wavelength branching means and a point where an optical axis of light fed from the second optical system into the wavelength branching means intersects the wavelength branching means is perpendicular to the second virtual plane.

5. An optical signal processor according to claim 4, wherein any two mirrors included in the reflecting means have respective inclination angles of reflecting surfaces different from each other about a line, parallel to the second virtual plane and perpendicular to an optical axis of the second optical system, passing the light-converging point.

6. An optical signal processor according to claim 4, wherein each mirror included in the reflecting means has a reflecting surface with an inclination angle variable about a line, parallel to the second virtual plane and perpendicular to an optical axis of the second optical system, passing the light-converging point.

7. An optical signal processor according to claim 3, further comprising:

polarization separating means disposed between the input/output means and the wavelength branching means; the polarization separating means separating the light fed into any of the plurality of input/output ports into respective polarized light components having first and second directions orthogonal to each other in terms of polarization, and outputting a first light beam of the polarized light component having the first direction and a second light beam of the polarized light component having the second direction; and polarization plane rotating means disposed between the polarization separating means and the wavelength branching means; the polarization plane rotating means receiving any of the first and second light beams outputted from the polarization separating means, rotating a polarization direction of the received light beam to make the first and second light beams have the same polarization direction yielding the highest wavelength branching efficiency in the wavelength branching means, and outputting thus rotated light beam;

wherein a line connecting a point where an optical axis of the first light beam fed from the first optical system into the wavelength branching means intersects the wavelength branching means and a point where an optical axis of the second light beam fed from the first optical system into the wavelength branching means intersects the wavelength branching means is parallel to the second virtual plane; and wherein a line connecting a point where an optical axis of the first light beam fed from the first optical system into the wavelength branching means intersects the wavelength branching means and a point where an optical axis of the second light beam fed from the second optical system into the wavelength branching means intersects the wavelength branching means is perpendicular to the second virtual plane.

8. An optical signal processor according to claim 1, wherein mirrors included in the reflecting means have respective reflecting surfaces with the same inclination angle about a line, perpendicular to the second virtual plane, passing the light-converging point.

9. An optical signal processor according to claim 1, wherein each mirror included in the reflecting means has a reflecting surface with an inclination angle variable in N stages, whereas the optical input/output means includes N+1 input/output ports (N being an integer of 2 or greater).

10. An optical signal processor according to claim 1, wherein each mirror included in the reflecting means has a reflecting surface with an inclination angle variable in N stages, whereas the optical input/output means includes 2N input/output ports (N being an integer of 2 or greater).

11. An optical signal processor according to claim 10, wherein the optical input/output means comprises a common input port, a common output port, an n-th channel input port, and an n-th channel output port as the 2N input/output ports; the n-th channel input port and n-th channel output port inputting or outputting signal light in the same channel; and wherein the number of input/output ports located between the common input port and the n-th channel input port is identical to the number of input/output ports located between the common output port and the n-th channel output port, where n=1 to N−1.

12. An optical signal processor according to claim 11, wherein the common input port and the common output port are adjacent to each other; and wherein the n-th channel input port and the n-th channel output port are adjacent to each other.

13. An optical signal processor according to claim 1, wherein a line of intersection between the reflecting surface of each mirror included in the reflecting means and a plane, parallel to the second virtual plane, including the light-converging point, is a curve in an area including a center position of the light-converging point.

14. An optical signal processor according to claim 13, wherein the curve has a variable curvature.

* * * * *